United States Patent
Komori et al.

[11] Patent Number: 5,786,942
[45] Date of Patent: Jul. 28, 1998

[54] ZOOM LENS AND ASPHERICAL LENS

[75] Inventors: Kazunori Komori; Takayuki Sensui, both of Tokyo, Japan

[73] Assignee: Asahi Kogaku Kogyo Kabushiki Kaisha, Tokyo, Japan

[21] Appl. No.: 725,050

[22] Filed: Oct. 2, 1996

[30] Foreign Application Priority Data

Oct. 3, 1995 [JP] Japan .................................. 7-279663

[51] Int. Cl.$^6$ .............................. G02B 15/14; G02B 3/02
[52] U.S. Cl. ..................................... 359/686; 359/715
[58] Field of Search ................................. 359/686, 715

[56] References Cited

U.S. PATENT DOCUMENTS 4,516,839   5/1985   Tokumaru.
5,513,045   4/1996   Ito et al. ................................... 359/750
5,568,323   10/1996  Sensui.

Primary Examiner—Georgia Y. Epps
Assistant Examiner—Evelyn A. Lester
Attorney, Agent, or Firm—Greenblum & Bernstein P.L.C.

[57] ABSTRACT

A zoom lens includes a negative first lens group, a positive second lens group, a negative third lens group and a positive fourth lens group, arranged in this order from an object side. The first lens group has a negative first lens element and a positive second element, arranged in this order from the object side, at least one surface of the two lens elements of the first lens group being a hybrid aspherical lens formed from a glass lens and a resin film layer. The zoom lens satisfies the relationship:

$$dmax/dmin<2$$

wherein the ratio of the maximum thickness dmax to the minimum thickness dmin of the resin film layer, within an effective diameter of the film layer.

5 Claims, 14 Drawing Sheets

ZOOM LENS AND ASPHERICAL LENS

BACKGROUND OF THE INVENTION

1. Field of the Invention

The present invention relates to a zoom lens having four lens groups, namely, a negative first lens group, a positive second lens group, a negative third lens group and a positive fourth lens group, arranged in this order from an object side. The present invention also relates to a hybrid aspherical lens.

2. Description of the Related Art

A conventional zoom lens having a negative first lens group, a positive second lens group, a negative third lens group and a positive fourth lens group, arranged in this order from an object side, is well known, as disclosed in, for example, U.S. Pat. No. 4,516,839. However, with the conventional zoom lens the problem exists that the size of the whole lens system cannot be made small since the total thickness of the first lens group, which has the largest diameter, is larger than the thickness necessary to correct an aberration.

SUMMARY OF THE INVENTION

An object of the present invention is to provide a zoom lens having a small size as a whole, by setting the thickness of the first lens group to be an appropriate value.

An aspect of the present invention achieves the above-mentioned object by providing a zoom lens having a negative first lens group, a positive second lens group, a negative third lens group and a positive fourth lens group, arranged in this order from an object side. An aspherical surface is employed in the first lens group so as to reduce the amount of aberration. The thickness of the first lens group is reduced to a sufficiently small value within a range in which an aberration can be appropriately corrected.

During a zooming operation from a wide-angle side toward a telephoto side, all the lens groups are moved so that a distance between the first and second lens groups is reduced, a distance between the second and third lens groups is increased, and a distance between the third and fourth lens groups is reduced.

In order to restrict the aberrations occurring in the first lens group when using two lenses in this lens group, it is necessary that the maximum vs. minimum difference in the thickness amount of an aspherical surface applied on the spherical surface should be a relatively large amount. That is, the difference in the thickness of the resin film layer applied to the glass lens (i.e., the difference between the maximum thickness and the minimum thickness of the film layer) should be set to be a relatively large value. However, since the light transmittance rate decreases as the thickness of the resin layer increases, in view of improving the theoretical optical performances, the minimum thickness is preferably set to be the smallest value within a range in which the film layer can be formed.

Note that, when the maximum vs. minimum difference in the applied thickness is large and the minimum thickness is small (a difference in thickness of the resin film layer can be expressed as a ratio between maximum and minimum thickness), the ratio expressing the difference between a thick portion and a thin portion becomes large. If the maximum v. minimum ratio of the film layer thicknesses is large, a part of the resin detaches from the surface of the mold, since the resin contracts irregularly when the resin becomes hard. Consequently, recesses or depressions called "sink marks" are liable to be formed. The depressions generally occur due to a separation of the resin material from the surface of the molding die, the separation is caused by a contraction of the resin. When such depressions occur, the aspherical surface does not take on the shape as designed, and consequently the desired performance cannot be obtained.

In order to prevent such depressions from occurring, the maximum vs. minimum ratio of thicknesses is reduced. To this effect, a predetermined amount of "bias" is applied to the thickness of the film layer (that is, a predetermined amount of the film layer is uniformly added to the thickness of the film layer), with which a theoretically optimum optical performance is still obtained, in the entire range within the effective diameter. With this treatment, while the aberration correction performance is not varied (because the difference between the maximum and minimum thicknesses is not varied) the depressions tend not to occur because the maximum vs. minimum ratio of thicknesses becomes small.

Specifically, the ratio of the minimum thickness dmin to the maximum thickness dmax preferably satisfies the following relationship:

$$dmax/dmin<2 \qquad (1)$$

The occurrence of the described depressions, while depending on a unit contraction amount of the resin used, can be suppressed by satisfying relationship (1), when commonly used optical resins, such as ultraviolet-curable resins, are employed. If the ratio defined in relationship (1) is larger than the upper limit, the ratio expressing the thickness difference becomes sufficiently large such that depressions are liable to occur.

Further, the minimum thickness within the effective diameter of the resin film layer preferably satisfies the following relationship:

$$0.3 \text{ mm}<dmin<0.8 \text{ mm} \qquad (2).$$

While the set value of the minimum thickness is related by relationship (1) to the maximum thickness, the difference in the applied amount is generally deemed to be approximately 0.5 mm at most. Therefore, by setting the minimum thickness to a value which satisfies relationship (2), the ratio of the maximum thickness versus minimum thickness can be held to a low value. If the ratio is smaller than the lower limit defined in relationship (2), there is a high probability that the ratio of the maximum thickness versus the minimum thickness increases to a high value, thereby causing depressions to occur. If the ratio exceeds the upper limit, the light transmittance rate through the film decreases.

The first lens group has a negative first lens element and a positive second lens element, arranged in this order from the object side. At least one surface of the two lens elements of the first lens group is an aspherical lens. The first lens group satisfies the following relationship:

$$0.30<dG1/fw<0.55 \qquad (3),$$

wherein, dG1 represents the thickness on the optical axis of the first lens group and fw represents the focal length of the entire lens system at the wide-angle extremity.

Relationship (3) specifies the thickness of the first lens group, i.e., the distance between the surface of the first lens element on the object side and the surface of the second lens element on the image side. If relationship (3) is satisfied, the first lens group can be made as small as possible so long as aberrations do not deteriorate upon zooming. If the ratio defined in relationship (3) is smaller than the lower limit, freedom in design is extremely restricted, and it is therefore difficult to cancel or eliminate the aberrations caused by the first and second lens elements of the first lens group. Consequently, the aberrations vary considerably during the zooming operation. If the ratio defined in relationship (3) exceeds the upper limit, the thickness of the first lens group is above a value necessary to correct the aberrations, resulting in an increase in the size of the whole lens system.

The aspherical lens in the zoom lens of the present invention can be a hybrid lens. A hybrid lens is formed by providing a resin film layer on a spherical surface of a glass lens. The glass lens preferably satisfies the following relationship:

$$1.50 < n1 < 1.76 \tag{4}$$

wherein n1 represents the refractive index of the glass lens element.

Relationship (4) specifies the refractive index of the glass lens in the first lens group. The refractive index of an optical plastic material is approximately 1.5 to 1.6, and the freedom to select the refractive index of an optical plastic material is therefore less than for an optical glass material. Accordingly, if the refractive index of the glass lens is set to satisfy relationship (4), a difference in the refractive index between the resin film layer and the glass lens can be reduced. If the refractive index difference is small, the glass lens and the resin film layer can be deemed to be an integral lens, so that the refraction of light at the boundary surface between the glass lens and the resin film layer can be restricted. Thus, insensitiveness to the error, or to irregularity in the shape of the boundary surface, or to a decentering or deviation thereof can be enhanced.

If the refractive index does not satisfy relationship (4), the difference in the refractive index between the glass lens and the resin film layer becomes sufficiently large such that (particularly in the case where the radius of curvature of the boundary surface is small) the optical properties can easily deteriorate due to a slight error or irregularity in the shape of the boundary surface, or due to decentering or deviation thereof.

According to another aspect of the present invention, there is provided a hybrid aspherical lens having a spherical glass lens and a resin film layer provided on one of the surfaces of the glass lens to form an aspherical surface. The ratio of the maximum thickness dmax to the minimum thickness dmin of the resin film layer, within an effective diameter of the film layer, satisfies the following relationship:

$$dmax/dmin < 2 \tag{1}$$

The present disclosure relates to subject matter contained in Japanese Patent Application No. 7-279663 (filed on Oct. 3, 1995) which is expressly incorporated herein by reference in its entirety.

BRIEF DESCRIPTION OF THE DRAWINGS

The invention will be described below in detail with reference to the accompanying drawings, in which similar elements are indicated by similar reference numerals, and wherein.

DESCRIPTION OF THE PREFERRED EMBODIMENTS

Figure 1:
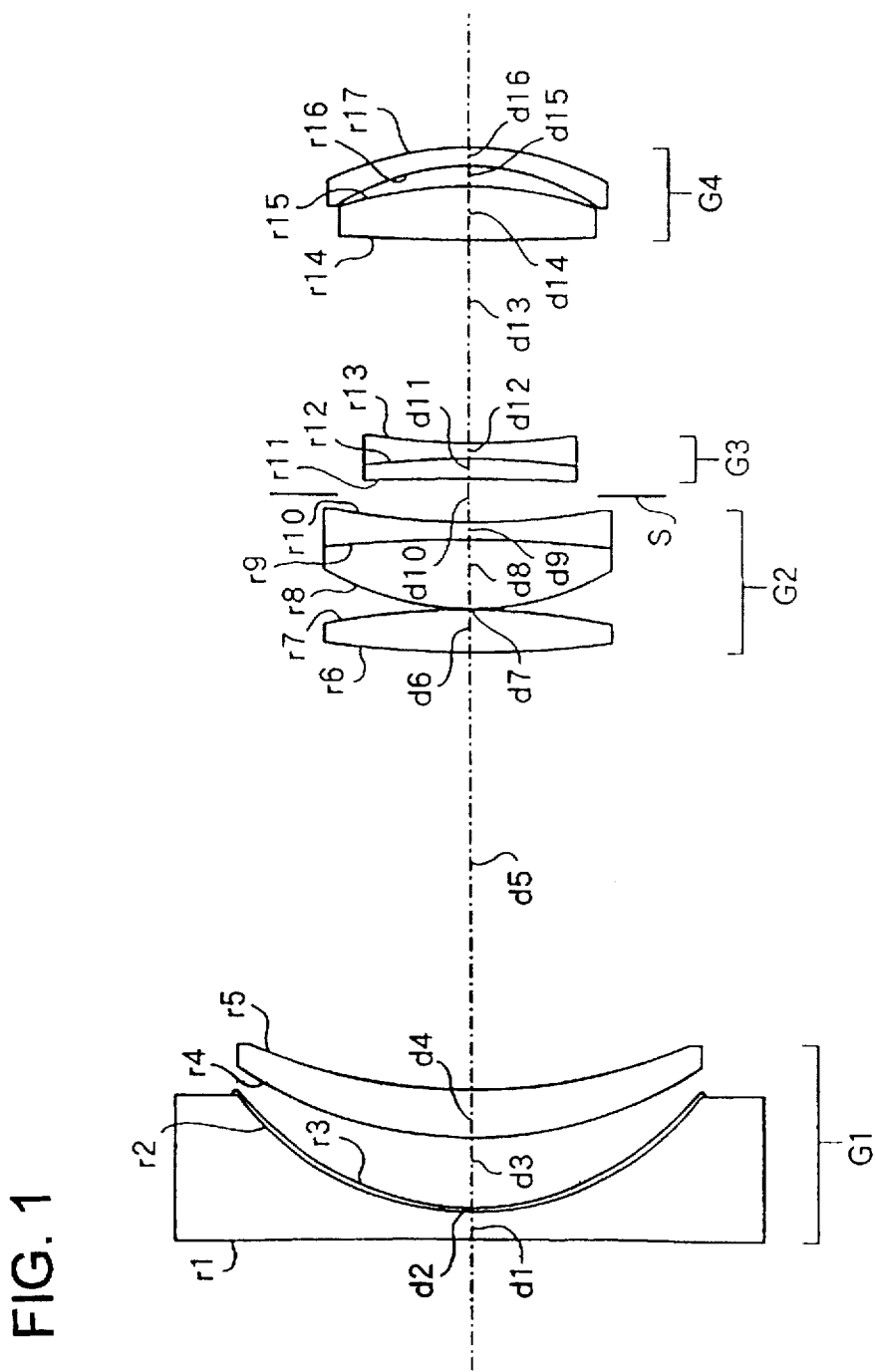
FIG. 1 is a schematic view of a lens arrangement of a zoom lens according to a first embodiment of the present invention, at a wide-angle extremity.
Figure 2:
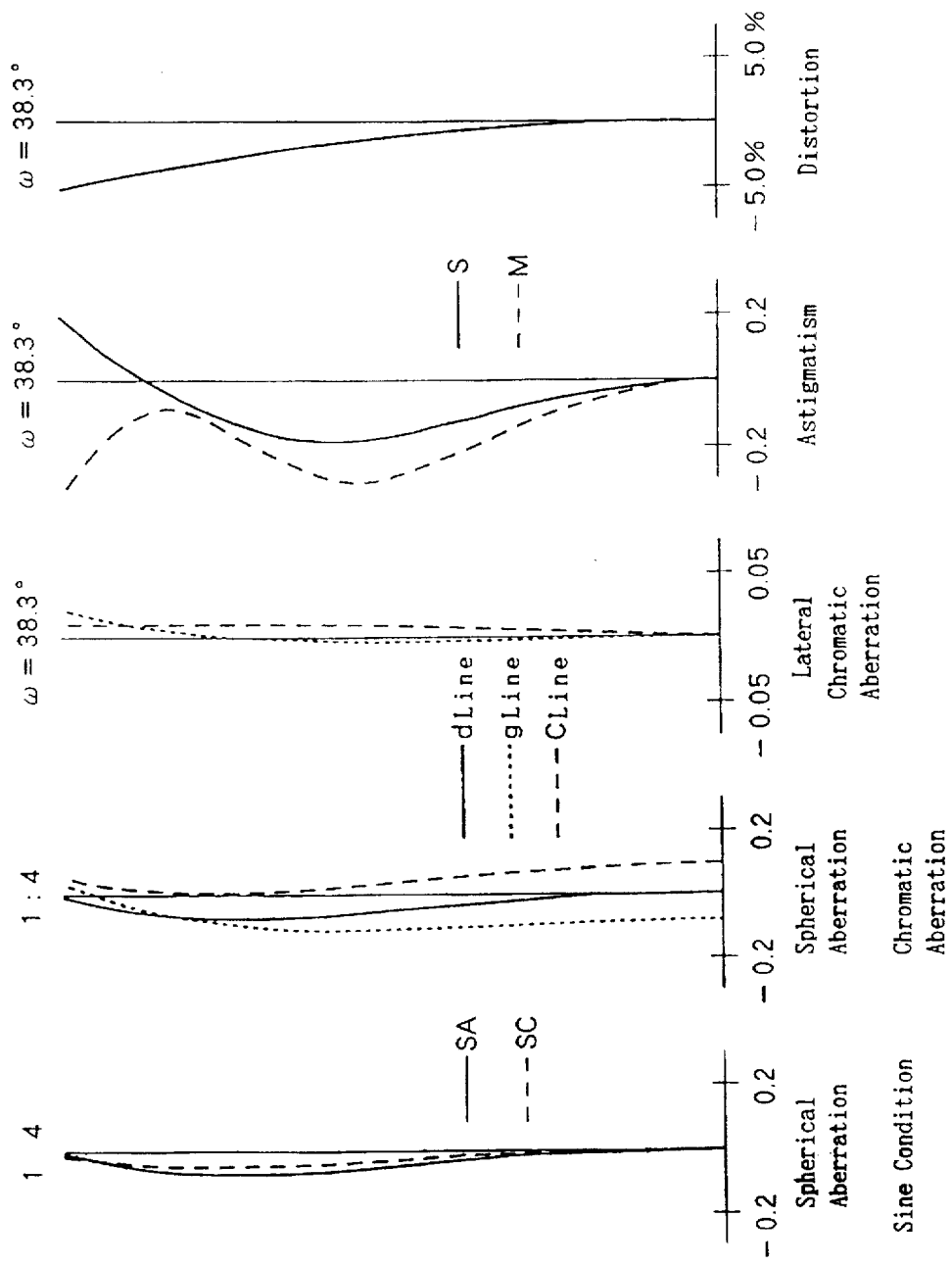
FIGS. 2A, 2B, 2C, 2D and 2E are aberration diagrams of the zoom lens of the first embodiment at the position shown in FIG. 1.
Figure 3:
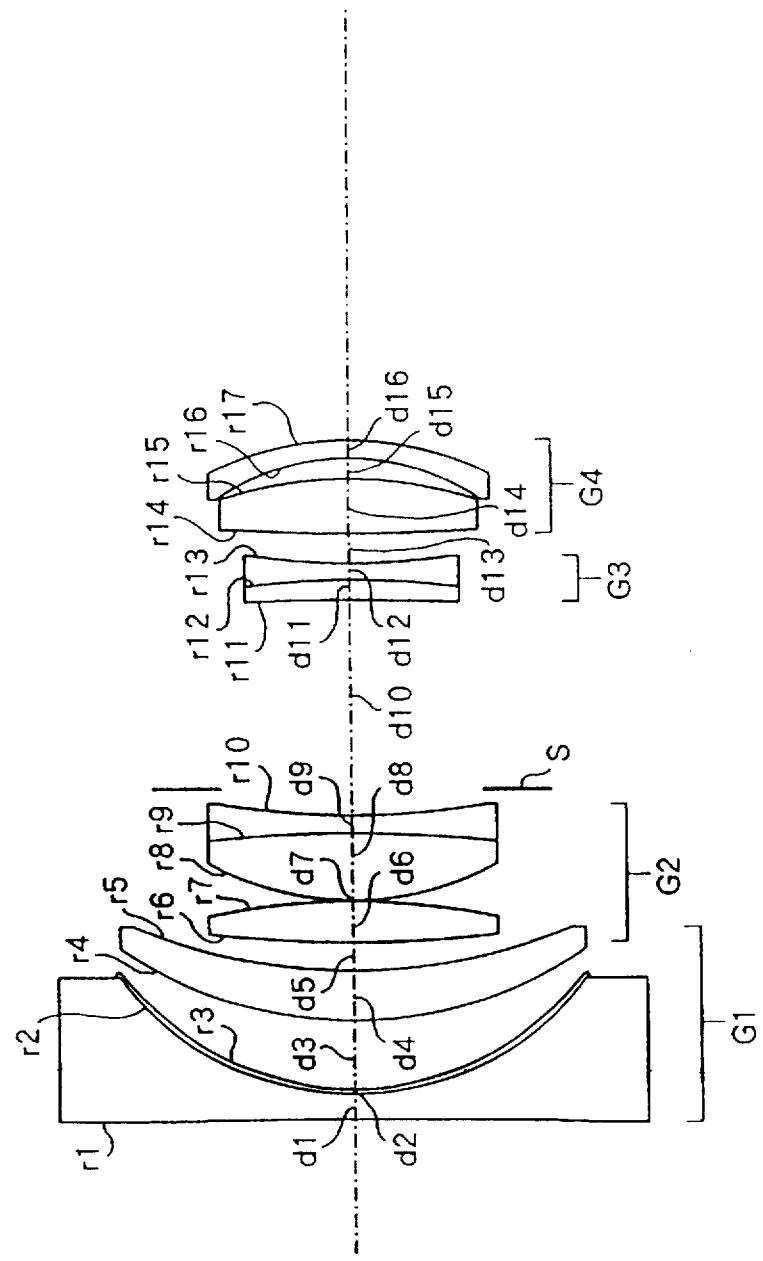
FIG. 3 is a schematic view of a lens arrangement of the zoom lens according to the first embodiment of the present invention, at a telephoto extremity.
Figure 4:
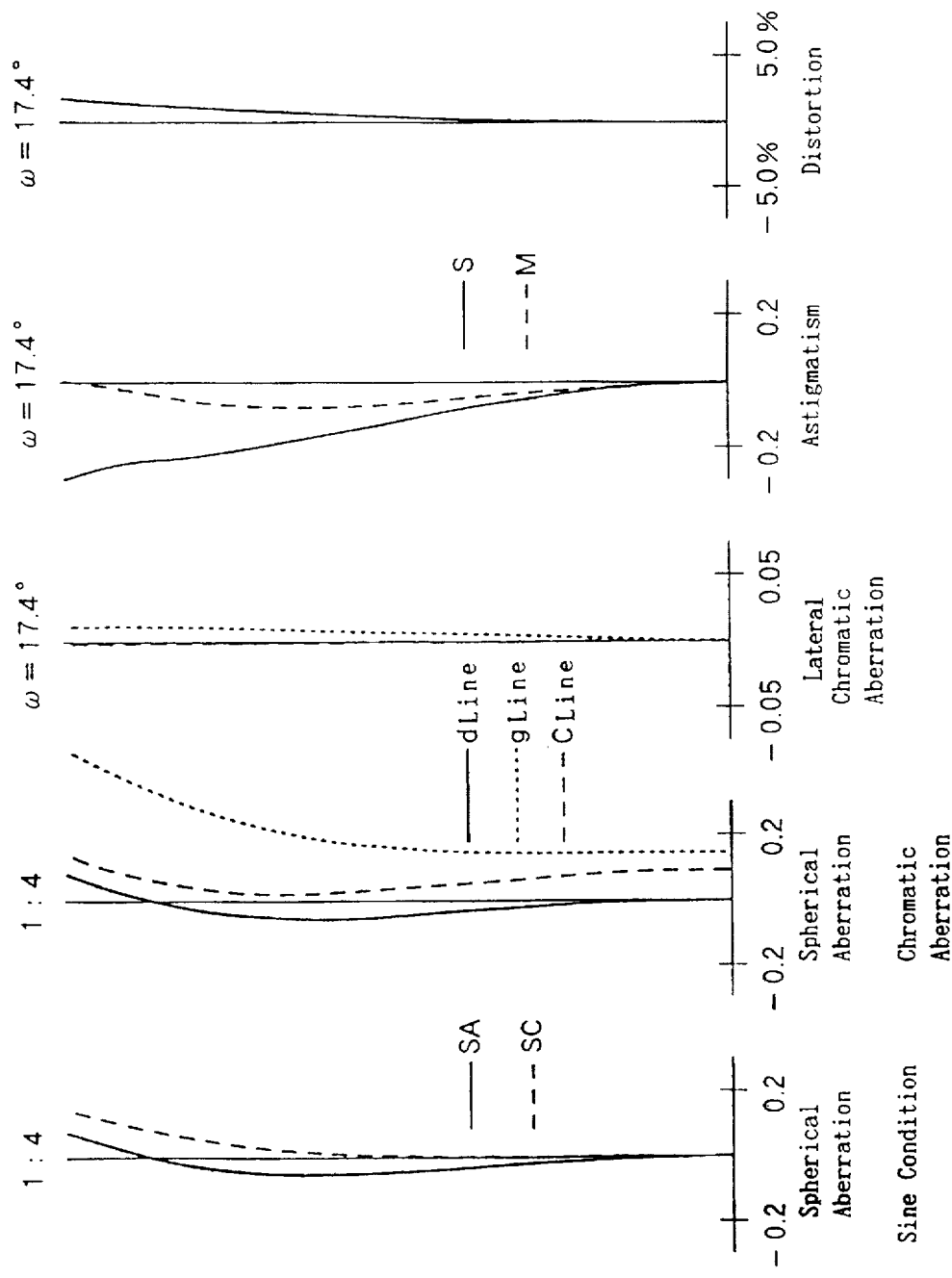
FIGS. 4A, 4B, 4C, 4D and 4E are aberration diagrams of the zoom lens of the first embodiment at the position shown in FIG. 3.

A zoom lens according to the present invention consists of a plurality of lens groups (four lens groups), as shown for example in FIGS. 1 and 3 (FIGS. 1 and 3 show the zoom lens at a wide-angle extremity and a telephoto extremity, respectively). The zoom lens consists of a negative first lens group G1, a positive second lens group G2, a negative third lens group G3 and a positive fourth lens group G4, arranged in this order from an object side (the left hand side in FIGS. 1 and 3).

The negative first lens group G1 consists of a negative first lens element and a positive second lens element, arranged in this order from the object side. The positive second lens group G2 consists of a positive lens element and a lens assembly consisting of cemented positive and negative lens elements, arranged in this order from the object side. The negative third lens group G3 consists of a lens assembly of cemented positive and negative lens elements. The fourth lens group G4 consists of a positive lens element and a negative lens element, arranged in this order from the object side.

Upon zooming from the wide-angle side (extremity) toward the telephoto side (extremity), each of the lens groups are moved so that a distance between the first lens group G1 and the second lens group G2 is reduced, a distance between the second lens group G2 and the third lens group G3 is increased, and a distance between the third lens group G3 and the fourth lens group G4 is reduced.

Figure 13:
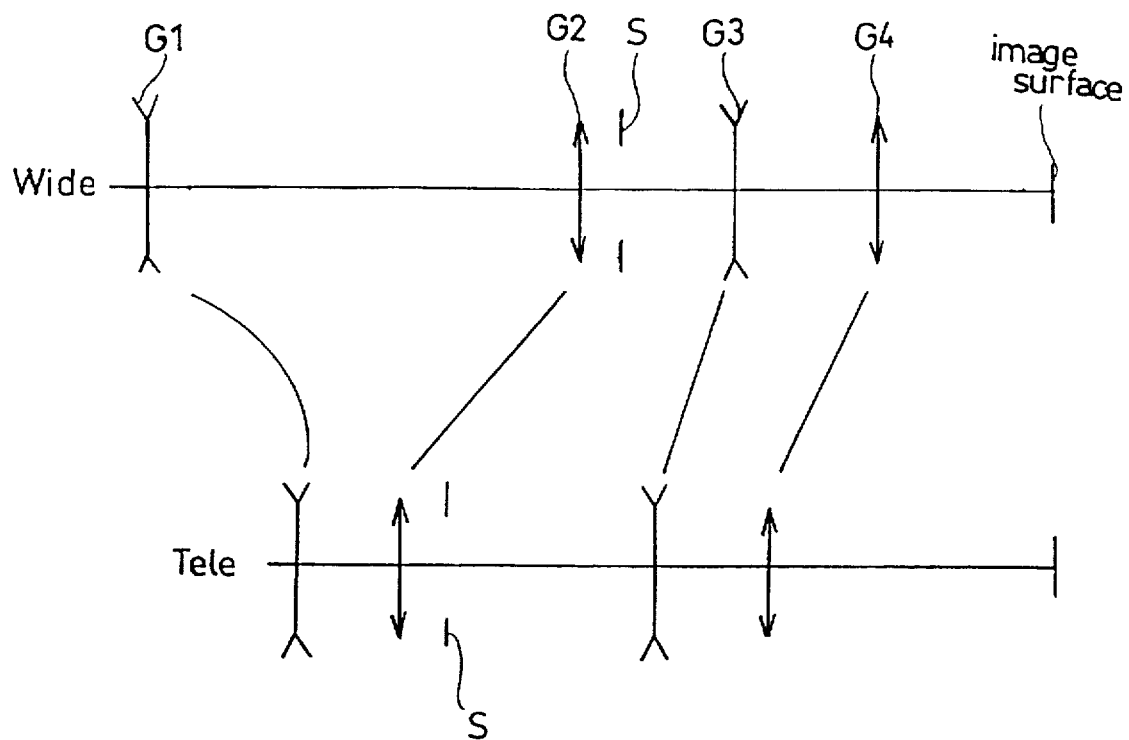
FIG. 13 is a schematic view of an example of loci of the movement of a zoom lens according to the present invention by way of example.

A diaphragm S is provided between the second and third lens groups G2 and G3. The diaphragm S is moved together with the second lens group G2 during the zooming operation. An example of the loci of the movement of the lens groups during the zooming operation is shown in FIG. 13.

Several (three) embodiments (examples) of the present invention will now be discussed below with reference to the accompanying diagrams and the following tables.

In the following tables "r" represents the radius of curvature, "d" represents the lens thickness or the distance between the lenses, "n" represents the refractive index of the d-line (588 nm), "v" represents the Abbe number, "f" represents the focal length, "fb" represents the back focal distance, "$F_{NO}$" represents the F-number, and, "ω" represents the half angle of view.

The five aberration drawings in each set (FIGS. 2A through 2E, 4A through 4E, 6A through 6E, 8A through 8E, 10A through 10E and 12A through 12E) for each lens represent: spherical aberration, with "SA" representing the spherical aberration, and "SC" representing the sine condition; chromatic aberration, with "d-line", "g-line" and "C-line" representing the chromatic aberrations represented by spherical aberrations, lateral chromatic aberrations; astigmatisms ("S" representing sagittal rays, and "M" representing meridional rays), and distortions, respectively.

First Embodiment

FIGS. 1 and 3 show a first embodiment of a lens arrangement of a zoom lens at a wide-angle extremity and at a telephoto extremity, respectively. Data regarding the first embodiment is shown in Tables 1 and 2 below.

FIGS. 2A through 2E and FIGS. 4A through 4E show the various aberrations in the first embodiment, at the wide-angle extremity and telephoto extremity, respectively.

The first lens group consists of a negative first lens element which is provided on the surface thereof on the image side with a resin film layer, and a positive second lens element. Surface Nos. 1 and 2 represent the base surface shape of the first lens element, and surface No. 3 represents the aspherical surface formed by the resin film layer applied to the second surface No. 2.

In the first embodiment, the third surface is an aspherical surface, as mentioned above. The shape of the aspherical surface can be generally expressed as follows:

$$X = CY^2/\{1+[1-(1+K)C^2Y^2]^{1/2}\} + A_4Y^4 + A_6Y^6 + A_8Y^8 + A_{10}Y^{10} + \ldots$$

wherein,

Y represents a height above the axis,

X represents a distance from a tangent plane of an aspherical vertex,

C represents a curvature of the aspherical vertex (1/r),

K represents a conic constant, $A_4$ represents a fourth-order aspherical factor, $A_6$ represents a sixth-order aspherical factor, $A_8$ represents an eighth-order aspherical factor, and $A_{10}$ represents a tenth-order aspherical factor.

The constants of the aspherical surface are shown in Table 3. The radii of curvature of the aspherical surface in Table 1 are those at the apex of the aspherical surface.

TABLE 1

| Surface No. | r | d | n | v |
|---|---|---|---|---|
| 1 | −900.000 | 1.70 | 1.60311 | 60.7 |
| 2 | 20.698 | 0.50 | 1.52540 | — |
| 3 | 17.567 | 5.40 | — | — |
| 4 | 28.980 | 3.68 | 1.84666 | 23.8 |
| 5 | 41.200 | variable | — | — |
| 6 | 105.520 | 2.92 | 1.72916 | 54.7 |
| 7 | −58.575 | 0.10 | — | — |
| 8 | 19.783 | 5.08 | 1.48749 | 70.2 |
| 9 | −128.547 | 1.30 | 1.81786 | 23.7 |
| 10 | 64.000 | 1.92 | — | — |
| Diaphragm | | variable | | |
| 11 | −263.618 | 1.58 | 1.80518 | 25.4 |
| 12 | −64.516 | 1.30 | 1.69680 | 55.5 |
| 13 | 52.387 | variable | — | — |
| 14 | −993.485 | 3.78 | 1.72916 | 54.7 |
| 15 | −25.674 | 1.43 | — | — |
| 16 | −16.202 | 1.30 | 1.80518 | 25.4 |
| 17 | −21.880 | — | — | — |

TABLE 2

| f | 29.00 | 52.00 | 68.00 |
|---|---|---|---|
| $F_{NO}$ | 1:4 | 1:4 | 1:4 |
| ω | 38.3° | 22.1° | 17.4° |
| fb | 36.69 | 36.69 | 36.69 |
| d5 | 32.70 | 8.10 | 2.00 |
| d10 | 1.13 | 9.32 | 14.19 |
| d13 | 15.39 | 7.19 | 2.32 |

TABLE 3

K = −1.000000
A4 = 0.666032 × 10⁻⁵
A6 = 0.280034 × 10⁻⁸
A8 = 0.109723 × 10⁻¹⁰
A10 = −0.243096 × 10⁻¹³

Second Embodiment

Figure 5:
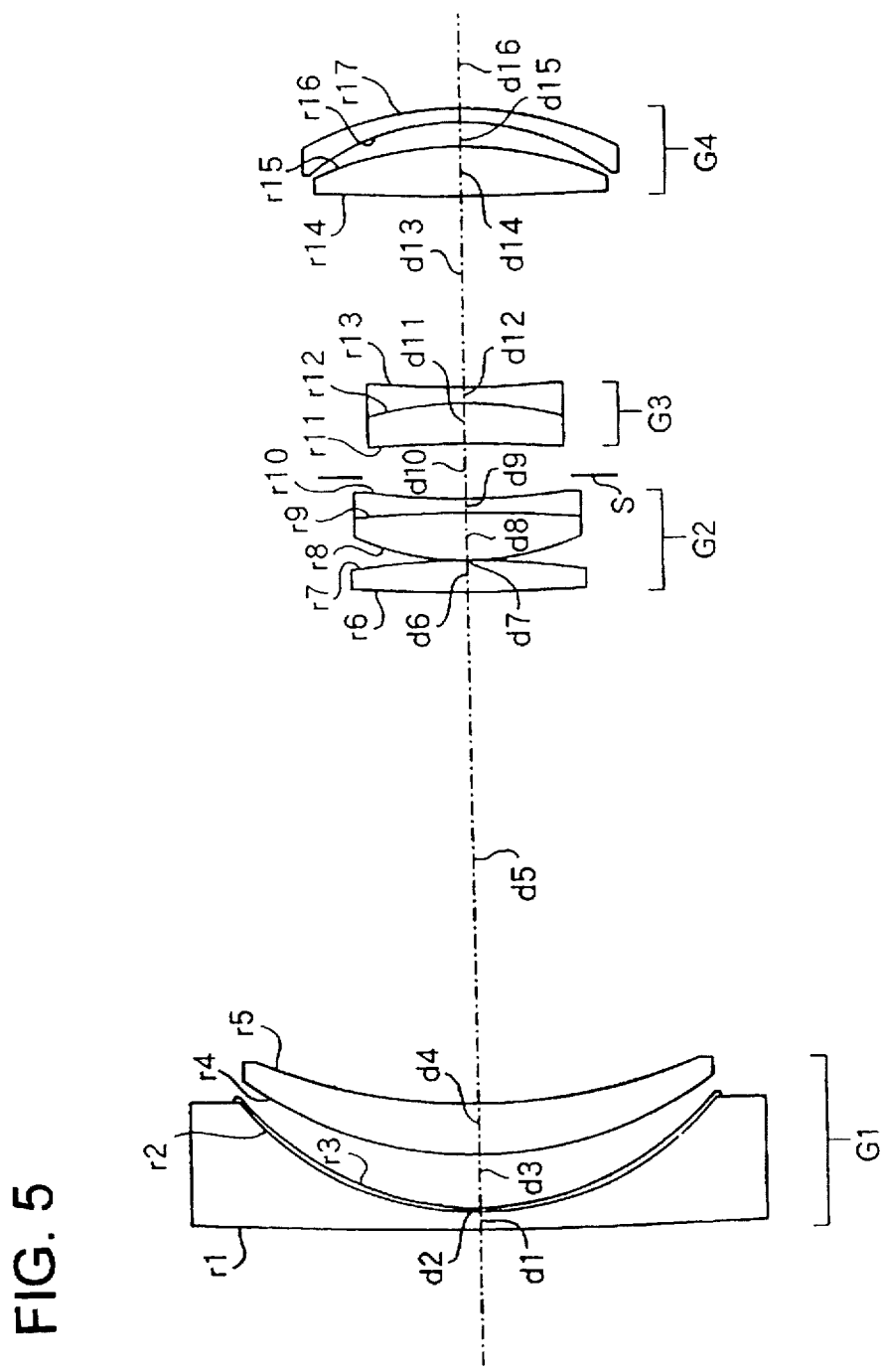
FIG. 5 is a schematic view of a lens arrangement of a zoom lens according to a second embodiment of the present invention, at a wide-angle extremity.
Figures 6A, 6B, 6C, 6D, 6E:
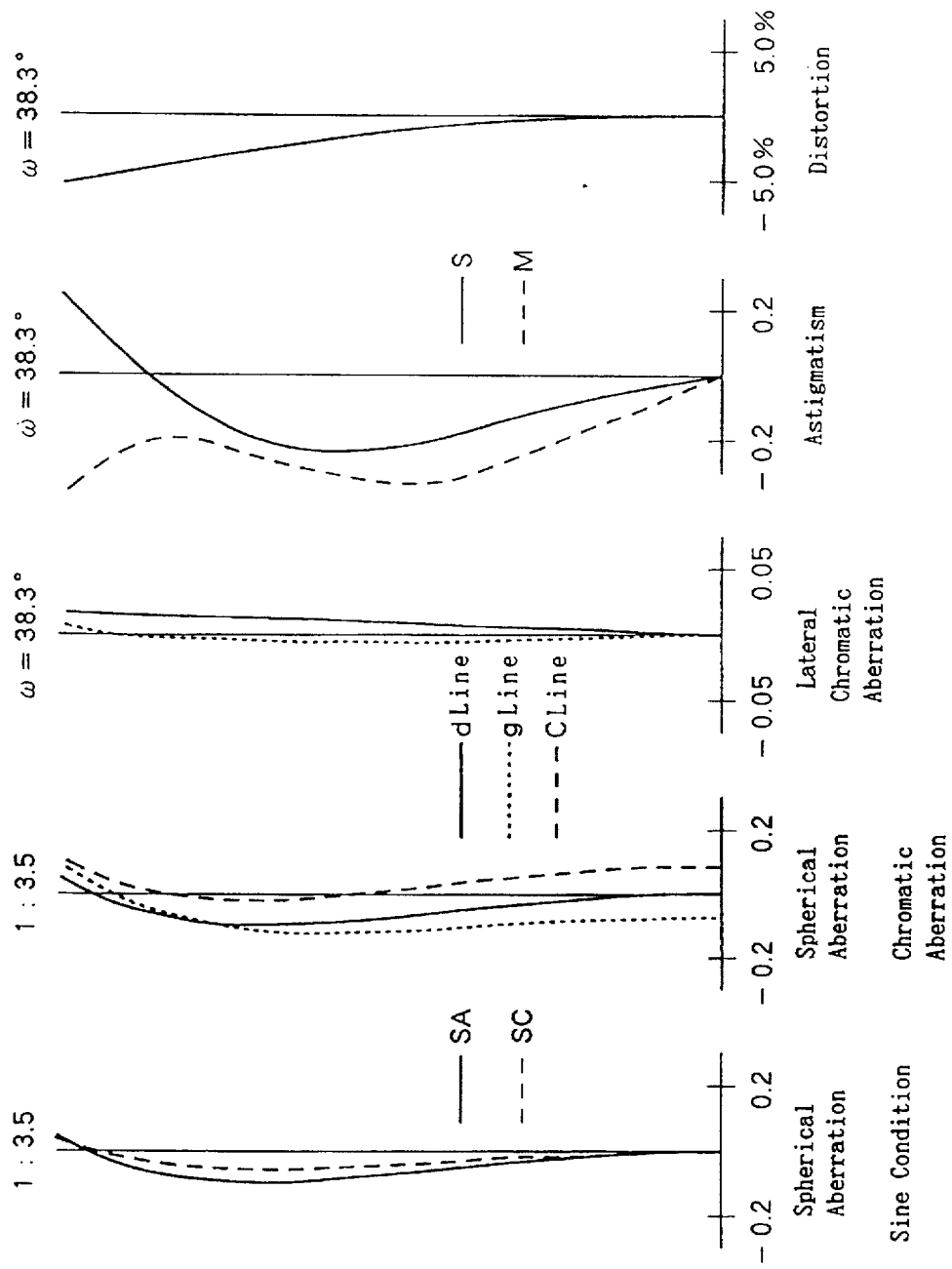
FIGS. 6A, 6B, 6C, 6D and 6E are aberration diagrams of the zoom lens of the second embodiment at the position shown in FIG. 5.
Figure 7:
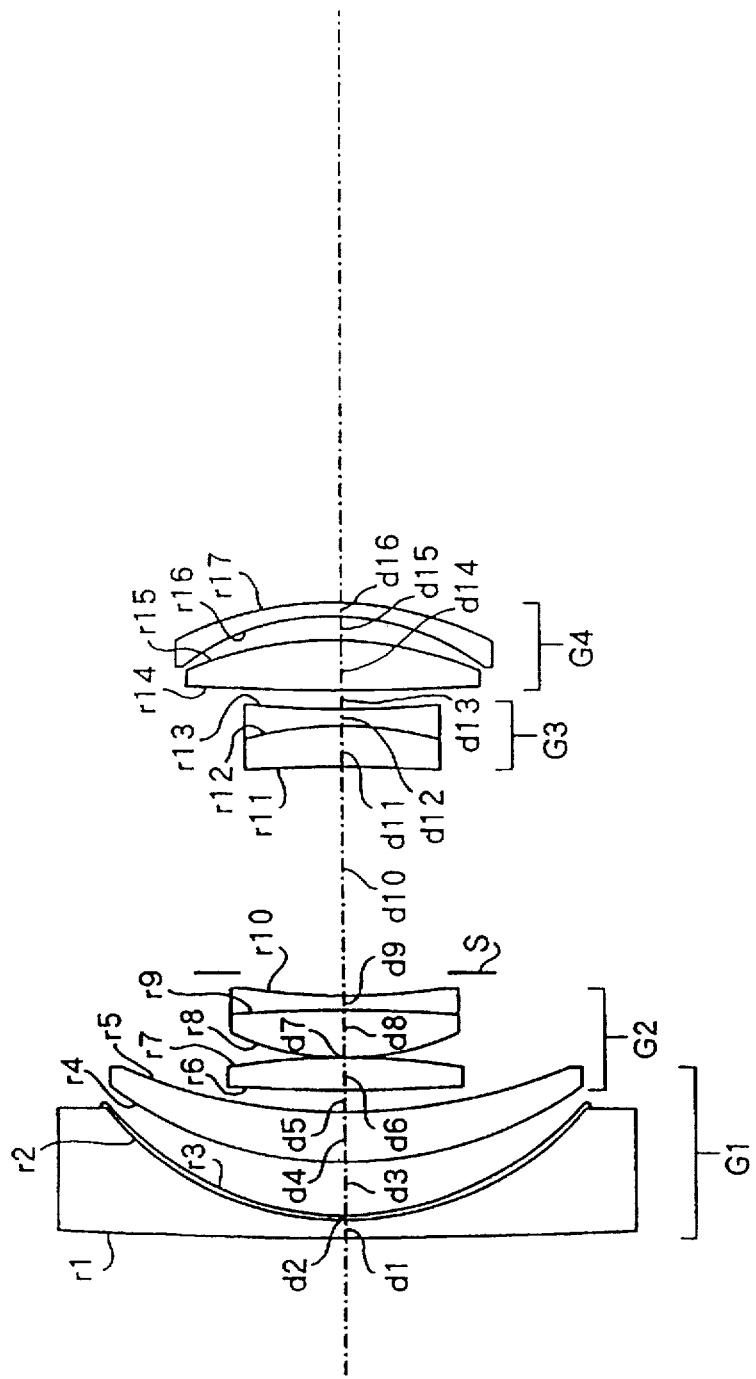
FIG. 7 is a schematic view of a lens arrangement of the zoom lens according to the second embodiment of the present invention, at a telephoto extremity.
Figure 8:
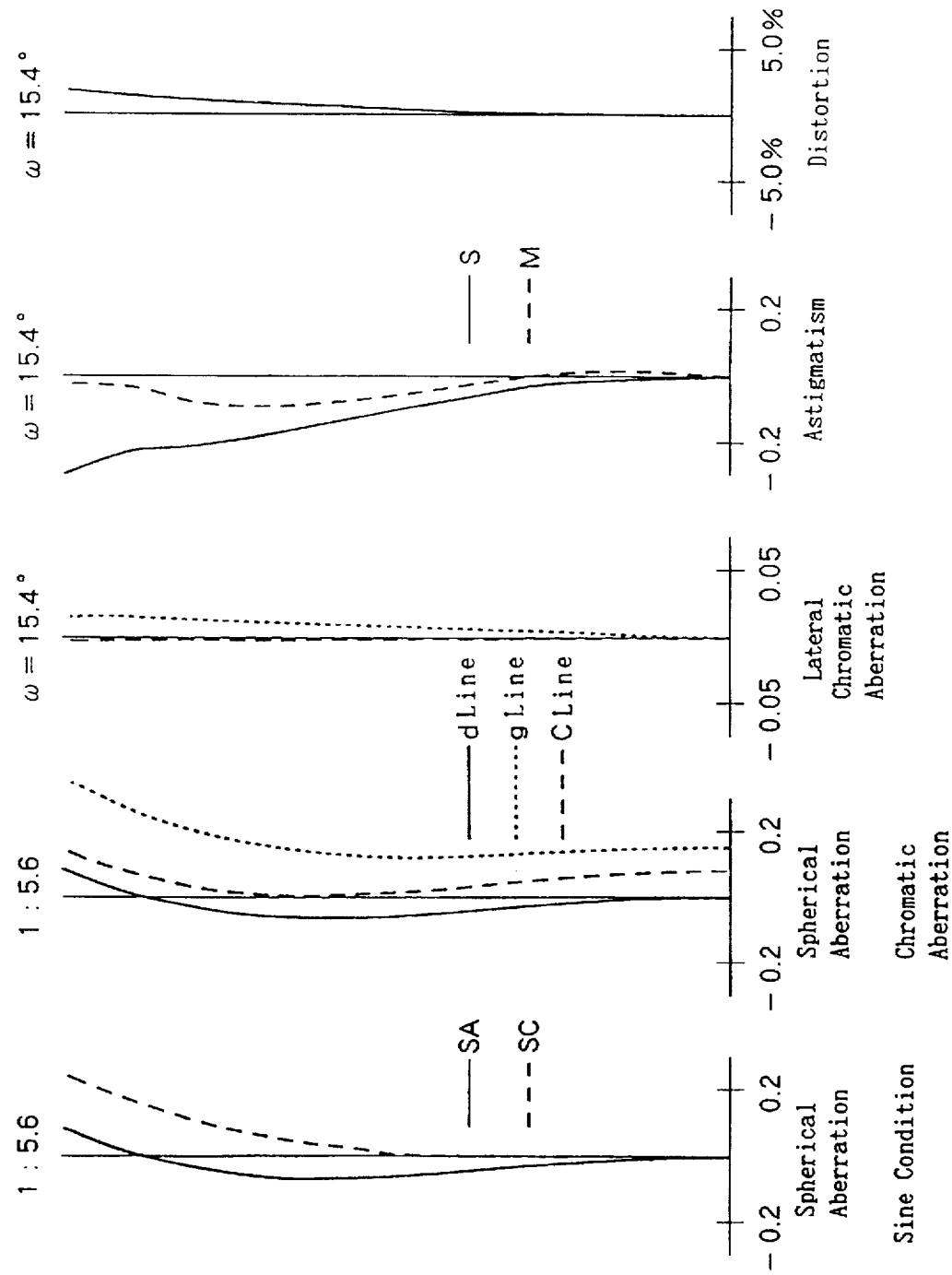
FIGS. 8A, 8B, 8C, 8D and 8E are aberration diagrams of the zoom lens of the second embodiment at the position shown in FIG. 7.

FIGS. 5 and 7 show a second embodiment of a lens arrangement of a zoom lens at a wide-angle extremity and at a telephoto extremity, respectively. Data regarding the second embodiment is shown in Tables 4 and 5 below.

In the second embodiment, the resin film layer is formed on the second surface of the first lens element on the image side, as in the first embodiment. The constants of the surface (surface No. 3) of the resin film layer which represent the shape of the aspherical surface are shown in Table 6. In the second embodiment, the diaphragm S is moved together with the second lens group G2.

FIGS. 6A through 6E and FIGS. 8A through 8E show the various aberrations in the second embodiment, at the wide-angle extremity and telephoto extremity, respectively.

TABLE 4

| Surface No. | r | d | n | v |
|---|---|---|---|---|
| 1 | 429.731 | 1.50 | 1.69680 | 55.5 |
| 2 | 21.859 | 0.50 | 1.53256 | 45.9 |
| 3 | 19.077 | 3.70 | — | — |
| 4 | 27.825 | 3.76 | 1.84666 | 23.8 |
| 5 | 41.440 | variable | — | — |
| 6 | 83.234 | 2.44 | 1.77250 | 49.6 |
| 7 | −61.352 | 0.10 | — | — |
| 8 | 19.315 | 3.46 | 1.48749 | 70.2 |

TABLE 4-continued

| Surface No. | r | d | n | v |
|---|---|---|---|---|
| 9 | −107.906 | 1.10 | 1.80518 | 25.4 |
| 10 | 51.600 | 1.52 | — | — |
| Diaphragm | | variable | | |
| 11 | −61.697 | 3.00 | 1.84666 | 23.8 |
| 12 | −2.6158 | 1.10 | 1.58144 | 40.7 |
| 13 | 49.258 | variable | — | — |
| 14 | 770.778 | 3.67 | 1.71299 | 53.9 |
| 15 | −26.066 | 1.76 | — | — |
| 16 | −16.923 | 1.10 | 1.80518 | 25.4 |
| 17 | −23.852 | — | — | — |

TABLE 5

| f | 29.00 | 55.00 | 77.00 |
|---|---|---|---|
| $F_{NO}$ | 1:3.5 | 1:4.5 | 1:5.6 |
| ω | 38.3° | 21.3° | 15.4° |
| fb | 36.92 | 36.92 | 36.92 |
| d5 | 38.13 | 9.79 | 1.53 |
| d10 | 2.52 | 9.71 | 15.36 |
| d13 | 14.35 | 7.16 | 1.51 |

TABLE 6

K = −1.000000
A4 = 0.470896 × 10$^{-5}$
A6 = 0.154255 × 10$^{-7}$
A8 = −0.318991 × 10$^{-10}$
A10 = 0.289932 × 10$^{-13}$

Third Embodiment

Figure 9:
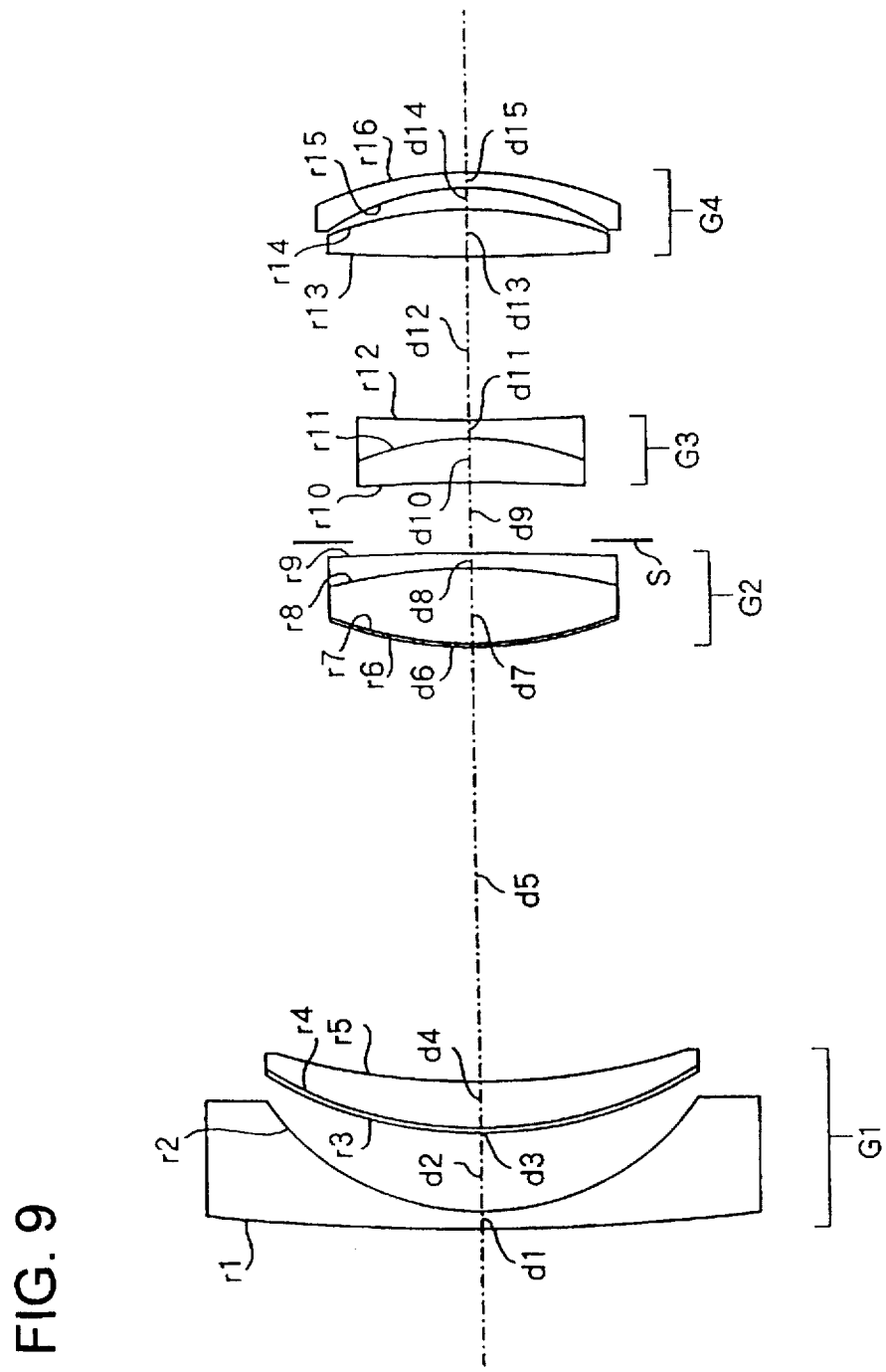
FIG. 9 is a schematic view of a lens arrangement of a zoom lens according to a third embodiment of the present invention, at a wide-angle extremity.
Figure 10:
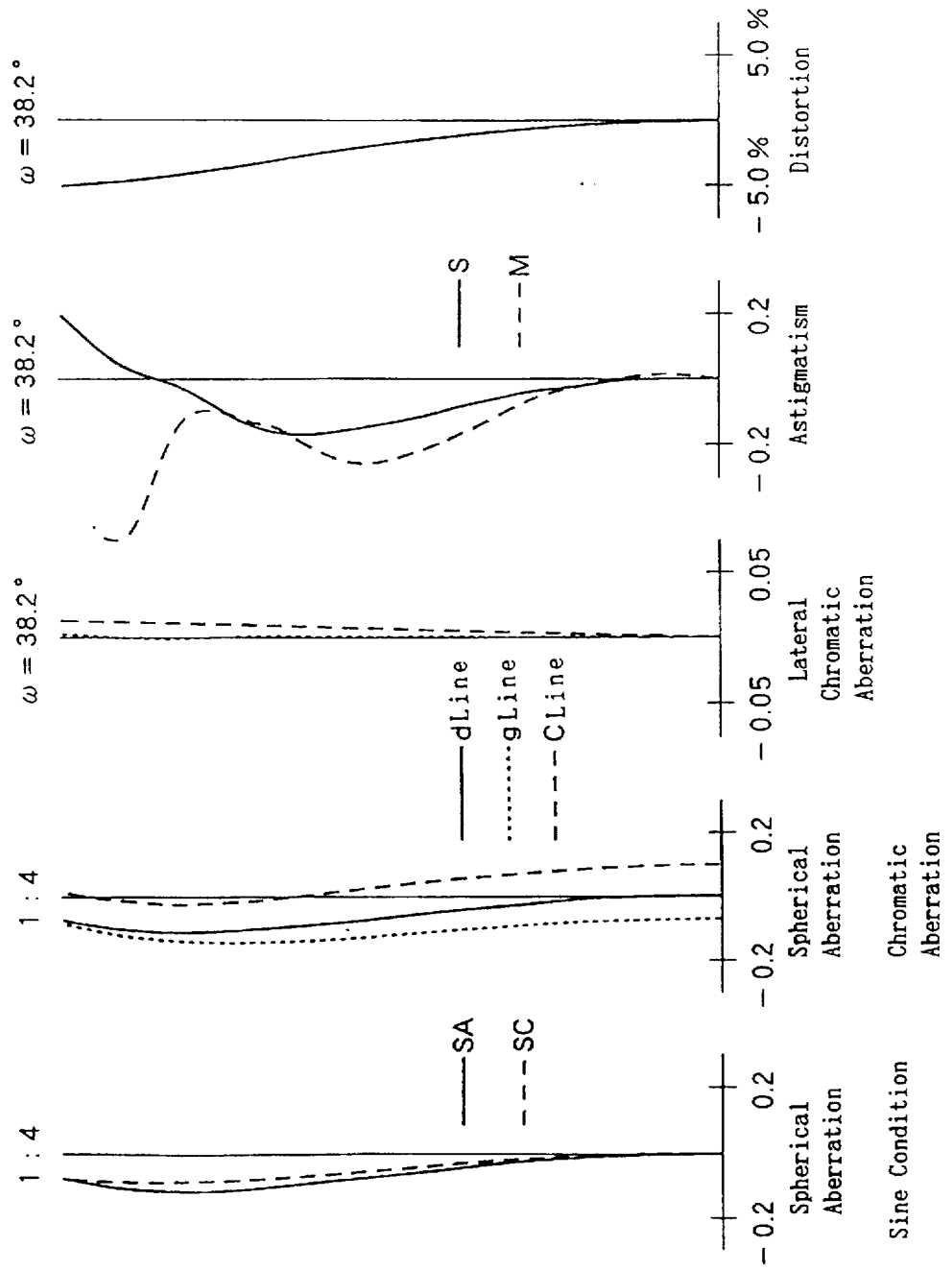
FIGS. 10A, 10B, 10C, 10D and 10E are aberration diagrams of the zoom lens of the third embodiment at the position shown in FIG. 9.
Figure 11:
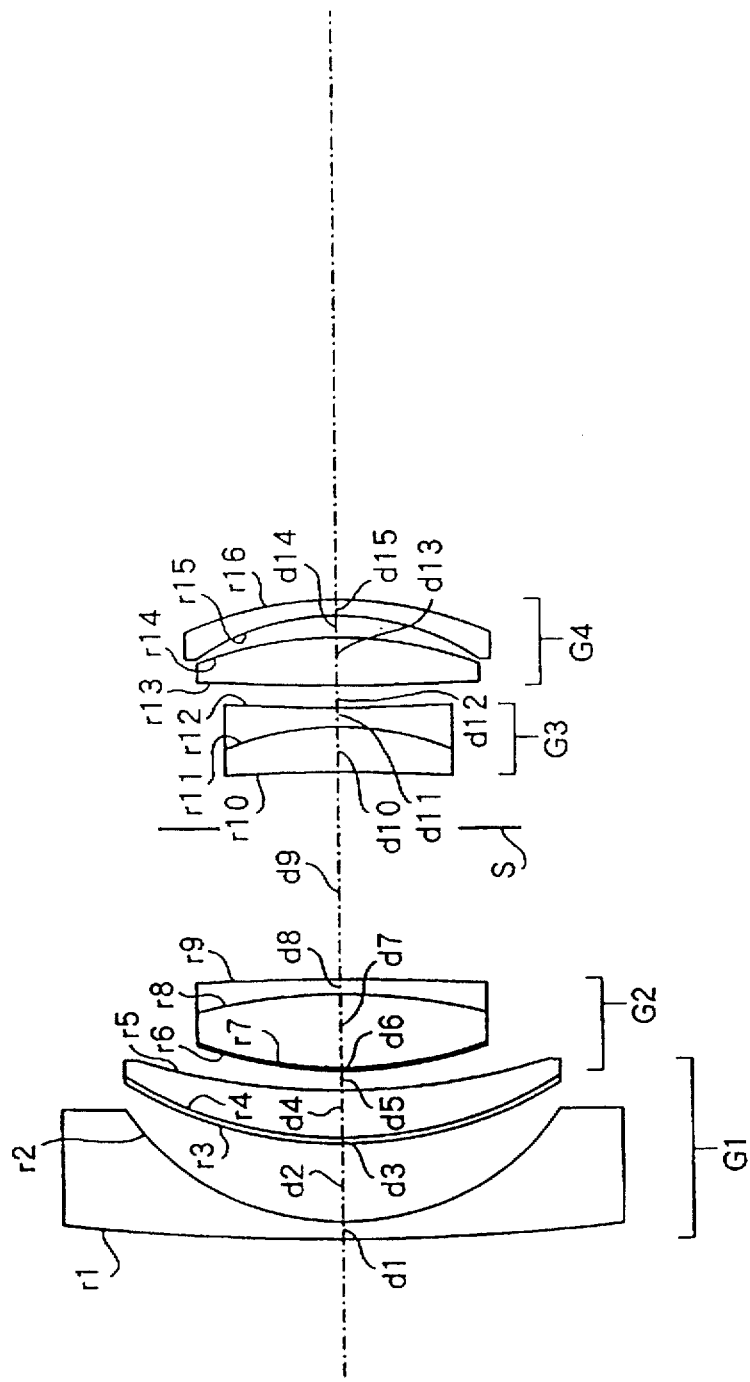
FIG. 11 is a schematic view of a lens arrangement of a zoom lens according to the third embodiment of the present invention, at a telephoto extremity.
Figures 12A, 12B, 12C, 12D, 12E:
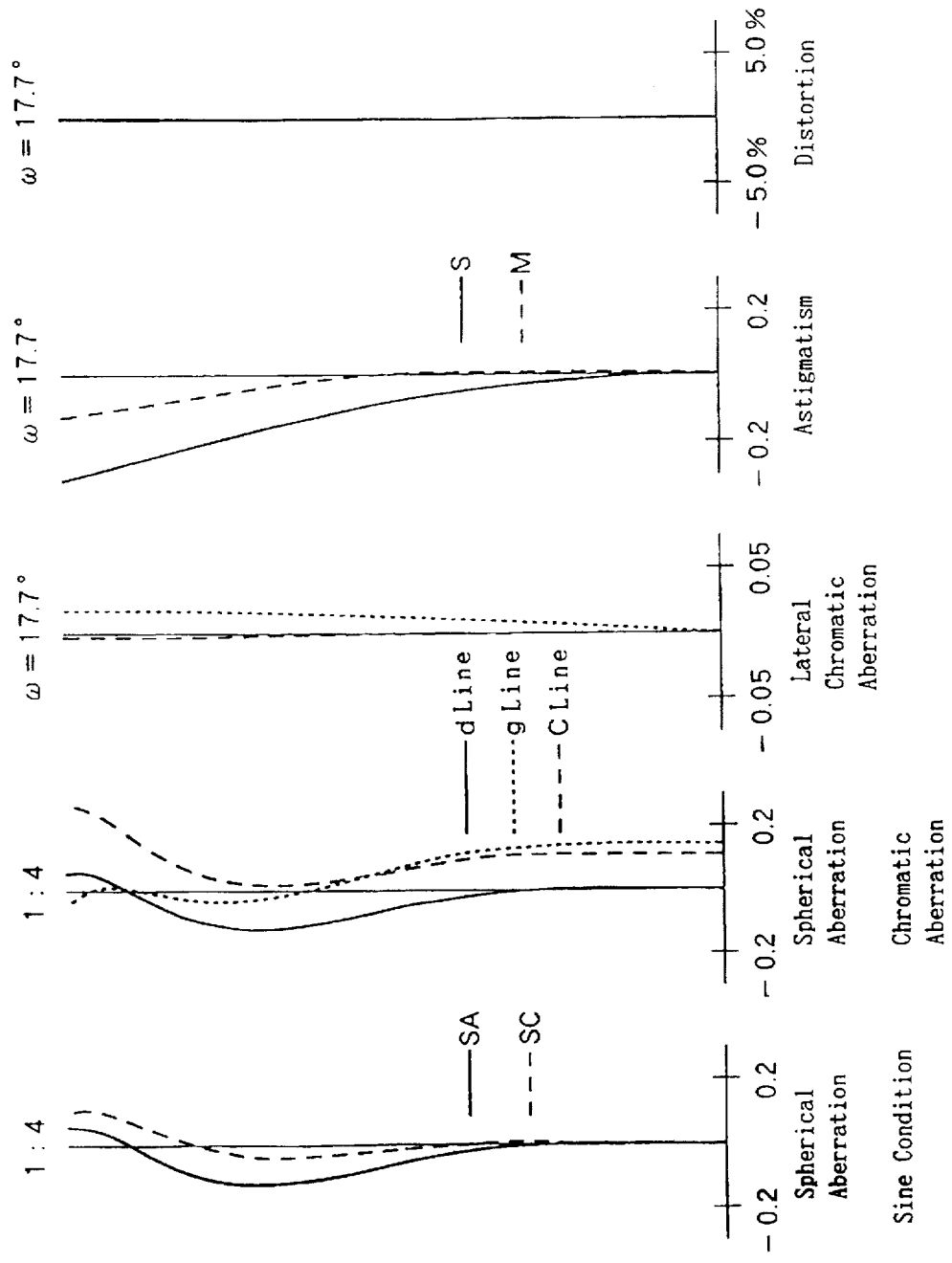
FIGS. 12A, 12B, 12C, 12D and 12E are aberration diagrams of the zoom lens of the third embodiment at the position shown in FIG. 11.

FIGS. 9 and 11 show a third embodiment of a lens arrangement of a zoom lens at a wide-angle extremity and at a telephoto extremity, respectively. Data regarding the third embodiment is shown in Tables 7 and 8 below.

In the third embodiment, resin film layers are formed on the surface of the positive second lens element of the first lens group G1 on the object side and on the object side surface of the lens element of the second lens group G2 that is located on the object side. The constants of the surfaces (surface Nos. 3 and 6) of the resin film layers which represent the shape of the aspherical surfaces are shown in Table 9. In the third embodiment, the diaphragm S is moved together with the third lens group G3.

FIGS. 10A through 10E and FIGS. 12A through 12E show the various aberrations in the third embodiment, at the wide-angle extremity and telephoto extremity, respectively.

TABLE 7

| Surface No. | r | d | n | v |
|---|---|---|---|---|
| 1 | 159.017 | 1.30 | 1.62041 | 60.7 |
| 2 | 18.276 | 6.05 | — | — |
| 3 | 40.354 | 0.50 | 1.52249 | 59.8 |
| 4 | 29.250 | 3.29 | 1.75520 | 27.5 |
| 5 | 50.730 | variable | — | — |
| 6 | 25.326 | 0.10 | 1.52249 | 59.8 |
| 7 | 25.326 | 5.58 | 1.72916 | 54.7 |
| 8 | −37.891 | 1.10 | 1.84666 | 23.8 |
| 9 | −258.549 | variable | — | — |
| Diaphragm | | 4.24 | | |
| 10 | −148.524 | 3.50 | 1.76182 | 26.5 |
| 11 | −20.119 | 1.10 | 1.66446 | 35.8 |
| 12 | 56.878 | variable | — | — |
| 13 | 137.802 | 3.59 | 1.69680 | 55.5 |

TABLE 7-continued

| Surface No. | r | d | n | v |
|---|---|---|---|---|
| 14 | −29.004 | 1.73 | — | — |
| 15 | −17.464 | 1.10 | 1.84666 | 23.8 |
| 16 | −25.628 | — | — | — |

TABLE 8

| f | 29.00 | 48.37 | 68.00 |
|---|---|---|---|
| $F_{NO}$ | 1:4 | 1:4 | 1:4 |
| ω | 38.2° | 24.5° | 17.7° |
| fb | 36.94 | 49.56 | 61.72 |
| d5 | 32.72 | 10.31 | 1.20 |
| d9 | 0.99 | 6.32 | 11.44 |
| d12 | 11.97 | 6.65 | 1.52 |

TABLE 9

| Surface No. 3 | Surface No. 6 |
|---|---|
| K = 0.000000 | K = 0.000000 |
| A4 = 0.120532 × 10$^{-4}$ | A4 = −0.776686 × 10$^{-6}$ |
| A6 = 0.371259 × 10$^{-7}$ | A6 = −0.761442 × 10$^{-8}$ |
| A8 = −0.113988 × 10$^{-9}$ | A8 = −0.603861 × 10$^{-10}$ |
| A10 = 0.560410 × 10$^{-12}$ | A10 = 0.117792 × 10$^{-12}$ |

Figure 14:
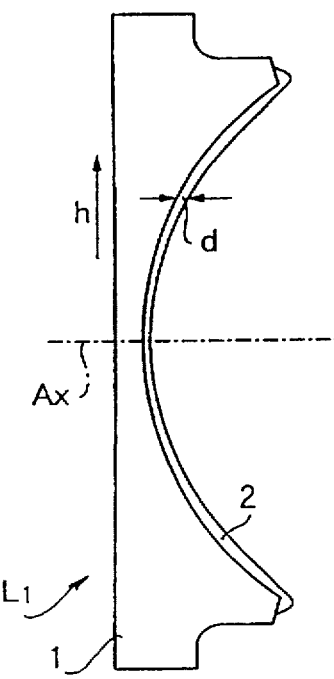
FIG. 14 is an enlarged view showing a first lens element of a first lens group according to the first and second embodiments.

FIG. 14 is an enlarged sectional view showing the first lens element L1 of the first and second embodiments. The spherical concave lens 1 is made of glass and is provided on the image side surface with a film layer 2 made of resin. The height from the optical axis Ax at which thickness is measured is represented by "h", and the thickness (applied amount) of the film layer 2 parallel in the optical axis direction is represented by "d".

The thickness d of the film layer 2 reaches the minimum value (dmin) on the optical axis (h=0), gradually increases as h, increasing and reaches the maximum value dmax at a predetermined height within full effective diameter. Thereafter, the thickness d gradually decreases outside of the effective diameter.

In embodiment 1, for example, in order to impart a predetermined aberration correction performance to the aspherical surface, it is necessary to set the difference between the maximum thickness dmax and the minimum thickness dmin to be 0.43 mm or larger. If, for example, in order to obtain an optimum optical performance, the minimum thickness dmin is set to the smallest value of 0.20 mm within a range in which the film layer can be formed, then the maximum thickness dmax becomes 0.63 mm. Accordingly, in this example case, the ratio of the maximum thickness to the minimum thickness would be expressed by the ratio of dmax/dmin=3.15.

In the first embodiment, in order to suppress the occurrence of depressions, a biased amount of 0.3 mm is applied (i.e., 0.3 mm thickness is uniformly added) to the film layer in the entire range within the effective diameter. Consequently, the minimum thickness is dmin=0.5 mm, the maximum thickness dmax=0.93 mm, and the ratio therebetween is dmax/dmin=1.86.

Figure 15A:
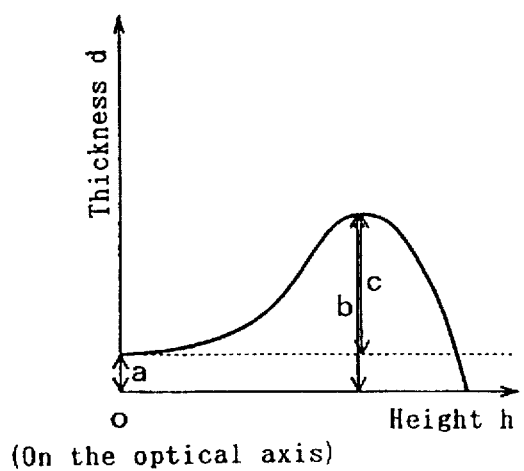
FIGS. 15A and 15B are graphs each showing a distribution of an applied amount of resin for forming an aspherical surface, FIG. 15A showing the case where an optimum optical performance in theory can be obtained, and FIG. 15B showing the case of the embodiment.
Figure 15B:
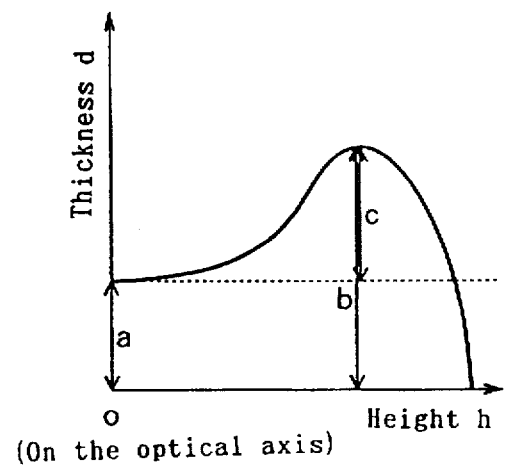

FIGS. 15A and 15B are graphs showing the variation of the thickness d of the film layer with respect to the height h from the optical axis. FIG. 15A shows the constitution of a thin film in which the optimum optical performance (in theory) can be obtained, and FIG. 15B shows the constitution of the thin film of the present invention.

In FIG. 15A, the ratio of the maximum thickness "b" based on the minimum thickness "a," in the theoretical case, is large. However, in the case of FIG. 15B, showing the thin film of the embodiments, while the difference "c" between the minimum thickness "a" and the maximum thickness "b" is the same, the ratio of the maximum thickness "a" to the minimum thickness "b" becomes smaller.

Tables 10 and 11 show data regarding the aspherical surfaces and variations of the thickness of the film layer at a height "h" from the optical axis for the four embodiments discussed above. The values of "dmax/dmin" (i.e., relationship (1)) thereof are also shown in Table 11.

TABLE 10

|     | Embodiment 1 | Embodiment 2 | Embodiment 3 |
|-----|--------------|--------------|--------------|
| R1  | 20.698       | 21.859       | −29.250      |
| C   | 0.048        | 0.046        | −0.034       |
| R2  | 17.567       | 19.077       | −40.354      |
| C   | 0.057        | 0.052        | −0.025       |
| K   | −1.00        | −1.00        | −0.00        |
| A4  | $6.6603 \times 10^{-6}$ | $4.7090 \times 10^{-6}$ | $-1.2053 \times 10^{-6}$ |
| A6  | $2.8003 \times 10^{-9}$ | $1.5426 \times 10^{-8}$ | $-3.7126 \times 10^{-8}$ |
| A8  | $1.0972 \times 10^{-11}$ | $-3.1899 \times 10^{-11}$ | $1.1399 \times 10^{-10}$ |
| A10 | $-2.4310 \times 10^{-14}$ | $2.8993 \times 10^{-14}$ | $-5.6041 \times 10^{-13}$ |

R1 and R2 denote the base surface radius of the glass lens and the aspherical radius of the resin layer, respectively.

TABLE 11

Thickness of the Resin Layer in the First Lens Group

| h | Embodiment 1 | Embodiment 2 | Embodiment 3 |
|---|--------------|--------------|--------------|
| 0.0 | #0.5000 | #0.5000 | #0.5000 |
| 1.0 | 0.5043 | 0.5033 | 0.5047 |
| 2.0 | 0.5171 | 0.5132 | 0.5187 |
| 3.0 | 0.5381 | 0.5294 | 0.5416 |
| 4.0 | 0.5669 | 0.5515 | 0.5728 |
| 5.0 | 0.6028 | 0.5789 | 0.6115 |
| 6.0 | 0.6447 | 0.6107 | 0.6563 |
| 7.0 | 0.6914 | 0.6461 | 0.7054 |
| 8.0 | 0.7412 | 0.6837 | 0.7566 |
| 9.0 | 0.7919 | 0.7220 | 0.8068 |
| 10.0 | 0.8405 | 0.7591 | 0.8520 |
| 11.0 | 0.8832 | 0.7921 | 0.8867 |
| 12.0 | 0.9147 | 0.8176 | *0.9029 |
| 13.0 | *0.9276 | *0.8305 | 0.8886 |
| 14.0 | 0.9117 | 0.8238 | 0.8253 |
| 15.0 | 0.8513 | 0.7874 | 0.6835 |
| 16.0 | 0.7226 | 0.7064 | 0.4172 |
| dmax/dmin | 1.86 | 1.66 | 1.81 |

(* and # denote dmax and dmin, respectively)

Table 12 shows numerical values for the above-mentioned relationships (2), (3) and (4) of the zoom lens in the embodiments. In Table 12, the symbols ○ and x represent "good" (that is, the values satisfy the relationships) and "bad" (that is, the values do not satisfy the relationships), respectively.

TABLE 12

|   | dmin(2) | dG1/fw(3) | nl(4) |
|---|---------|-----------|-------|
| Embodiment 1 | 0.5000 ○ | 0.39 ○ | 1.60311 ○ |
| Embodiment 2 | 0.5000 ○ | 0.33 ○ | 1.69680 ○ |
| Embodiment 3 | 0.5000 ○ | 0.38 ○ | 1.75520 ○ |

What is claimed is:

1. A zoom lens comprising: a negative first lens group; a positive second lens group; a negative third lens group; and a positive fourth lens group, arranged in this order from an object side, wherein upon zooming from a wide-angle side toward a telephoto side, all said lens groups are moved so that a distance between said first and second lens groups is reduced, a distance between second and third lens groups is increased, and a distance between said third and fourth lens groups is reduced, wherein said first lens group includes a negative first lens element and a positive second lens element, arranged in this order from said object side, at least one of said two lens elements being an aspherical lens, said aspherical lens comprising a hybrid lens including a resin film layer provided on one surface of a glass lens elements, and wherein a ratio of a maximum thickness dmax to a minimum thickness dmin of said resin film layer, within a full effective diameter of said resin film layer, satisfies the relationship:

$$dmax/dmin<2.$$

2. The zoom lens according to claim 1, wherein said minimum thickness dmin of said film layer, within a full effective diameter of said resin film layer, satisfies the relationship:

$$0.3 \text{ mm}<dmin<0.8 \text{ mm}.$$

3. The zoom lens according to claim 1, wherein said aspherical lens satisfies the relationship:

$$1.50<n1<1.76$$

wherein n1 represents a refractive index of said glass lens element on which said resin film layer is applied.

4. The zoom lens according to claim 1, wherein said zoom lens satisfies the relationship:

$$0.30<dG1/fw<0.55$$

wherein dG1 represents a thickness of said negative first lens group on an optical axis of said zoom lens, and fw represents a focal length of said zoom lens at an extremity of said wide-angle side.

5. A hybrid aspherical lens comprising a spherical glass lens and a resin film layer provided on one of the surfaces of said spherical glass lens to form an aspherical surface, wherein a ratio of a maximum thickness dmax to a minimum thickness dmin of said resin film layer, within a full effective diameter of said film layer, satisfies the relationship:

$$dmax/dmin<2.$$

* * * * *